(12) United States Patent
Hou et al.

(10) Patent No.: US 12,427,452 B2
(45) Date of Patent: Sep. 30, 2025

(54) INDEPENDENT DOUBLE-NEGATIVE-PRESSURE SHALE SHAKER

(71) Applicant: Southwest Petroleum University, Chengdu (CN)

(72) Inventors: Yongjun Hou, Chengdu (CN); Duyu Hou, Chengdu (CN); Mingjun Du, Chengdu (CN); Pan Fang, Chengdu (CN); Yuwen Wang, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 678 days.

(21) Appl. No.: 17/887,804

(22) Filed: Aug. 15, 2022

(65) Prior Publication Data
US 2023/0131096 A1 Apr. 27, 2023

(30) Foreign Application Priority Data
Oct. 22, 2021 (CN) .......................... 202111229994.0

(51) Int. Cl.
*B01D 33/01* (2006.01)
*B01D 33/41* (2006.01)
*B01D 33/74* (2006.01)
*E21B 21/06* (2006.01)

(52) U.S. Cl.
CPC ......... *B01D 33/0183* (2013.01); *B01D 33/41* (2013.01); *B01D 33/745* (2013.01); *B01D 2201/204* (2013.01); *E21B 21/065* (2013.01)

(58) Field of Classification Search
CPC .. B01D 33/0183; B01D 33/41; B01D 33/745; B01D 2201/204; E21B 21/065; E21B 21/066
See application file for complete search history.

(56) References Cited

U.S. PATENT DOCUMENTS 7,198,156 B2 * 4/2007 Schulte .............. B01D 33/0376
209/267

* cited by examiner

*Primary Examiner* — Thuan D Dang
(74) *Attorney, Agent, or Firm* — JEEN IP LAW, LLC (57) ABSTRACT

Disclosed is an independent double-negative-pressure shale shaker, and belongs to the technical field of petroleum drilling solid control. The independent double-negative-pressure shale shaker comprises a base, a fluid discharge device, an inclination angle adjustment mechanism, a screening device, an exciting motor and a double-negative-pressure system, wherein the double-negative-pressure system comprises a first negative-pressure system and a second negative-pressure system which are relatively independent; the first negative-pressure system dries drilling fluid of a first screen mesh set close to a material outlet, and the second negative-pressure system increases the treatment capacity of drilling fluid of a second screen mesh set close to the first screen mesh set; and meanwhile, in the deep well section, the second negative-pressure system can be switched to a fluid mist suction state, fluid mist on the screen surface is reduced, the safety is improved, and the pollution of fluid mist is reduced.

18 Claims, 8 Drawing Sheets

INDEPENDENT DOUBLE-NEGATIVE-PRESSURE SHALE SHAKER

CROSS REFERENCE TO RELATED APPLICATION

This patent application claims the benefit and priority of Chinese Patent Application No. 202111229994.0 filed on Oct. 22, 2021, the disclosure of which is incorporated by reference herein in its entirety as part of the present application.

TECHNICAL FIELD

The present disclosure relates to the technical field of solid phase control for petroleum drilling, and specifically relates to an independent double-negative-pressure shale shaker.

BACKGROUND

A negative-pressure shale shaker can greatly decrease fluid content of drilling cuttings, effectively recover drilling fluid and reduce the environmental treatment volume of waste drilling cuttings, and has remarkable economic benefits and social benefits. According to an existing exhaust fan negative-pressure shale shaker technology, an exhaust fan is adopted to form negative pressure below the first screen mesh at an outlet end of the shaker, or to form negative pressure below the first screen mesh, the second screen mesh and even more screen meshes at the outlet end. In order to avoid the slurry leakage phenomenon of the negative-pressure shale shaker, only a small part of the area of the first screen mesh at the outlet is covered with drilling fluid. The exhaust fan sucks so that a large amount of air passes through the screen mesh from the screen surface, which has a good drying effect on drilling cuttings. However, the difference between the pressures above and below the screen mesh is small. One exhaust fan is adopted below the multiple screen meshes at the outlet end to form negative pressure, which cannot remarkably improve the screen penetrating capacity of drilling fluid covering the screen meshes, and in other words, the treatment amount of the shaker cannot be remarkably increased. Meanwhile, in the deep well section, drilling fluid is small in flow and high in temperature, and much fluid mist is generated during operation of screening device, resulting in potential safety risk.

SUMMARY

The present disclosure aims to provide an independent double-negative-pressure shale shaker to address the problems that an existing negative-pressure shale shaker is small in treatment capacity, and more fluid mist can be generated in the deep well section, thereby resulting in potential safety risks.

The technical scheme for addressing the above technical problems is as follows.

An independent double-negative-pressure shale shaker includes a base, a fluid discharge device, an inclination angle adjustment mechanism, a screening device, an exciting motor and a double-negative-pressure system, wherein the fluid discharge device and the inclination angle adjustment mechanism are arranged on the base, the screening device is arranged on the inclination angle adjustment mechanism, the exciting motor is arranged on the screening device, and the double-negative-pressure system is arranged on the base;

the screening device includes a housing, and a first screen mesh set and a second screen mesh set which are arranged in the housing and are sequentially arranged in a direction from a material outlet to a material inlet; a first vacuum disc and a second vacuum disc are respectively arranged at a bottom of the first screen mesh set and a bottom of the second screen mesh set, and a bottom of the first vacuum disc and a bottom of the second vacuum disc each communicate with the fluid discharge device;

the double-negative-pressure system includes a support arranged on the base, and a first negative-pressure system, a second negative-pressure system and a fluid mist separator which are arranged on the support; the first negative-pressure system communicates with the fluid mist separator and the first vacuum disc; the second negative-pressure system communicates with the fluid mist separator and the second vacuum disc; and the second negative-pressure system further communicates with a position of a top of the housing corresponding to the second screen mesh set through a fluid mist hose, and an on-off valve is arranged on the fluid mist hose.

In accordance with the present disclosure, the double-negative-pressure system includes two independent negative-pressure systems, namely the first negative-pressure system and the second negative-pressure system. The first negative-pressure system communicates with the first vacuum disc close to the material outlet. The second negative-pressure system communicates with the adjacent second vacuum disc. There is less drilling fluid in the first screen mesh set close to the material outlet. The drying capacity of drilling cuttings can be fully exerted through the first negative-pressure system, so that the drying effect is good, and the recovery efficiency of drilling fluid is high. There is more drilling fluid generated in the second screen mesh set adjacent to the first screen mesh set. Higher negative pressure is formed in the second screen mesh set through the second negative-pressure system, so that the screening capacity of the drilling fluid is improved, and the treatment capacity of the negative-pressure shaker is effectively increased. Meanwhile, because the second negative-pressure system further communicates with the housing through the fluid mist hose, in the deep well section, the required treatment capacity of drilling fluid is smaller, but the temperature of the drilling fluid is high, and the fluid mist on the screen surface is increased, the second negative-pressure system can be switched to a fluid mist suction state by switching on a cut-off valve, thereby reducing the fluid mist on the screen surface, improving the safety, and decreasing the pollution of fluid mist.

Further, the first negative-pressure system and the second negative-pressure system are structurally consistent, and each include an exhaust fan, a bent pipe, a connecting pipe and a vacuum hose which are sequentially connected; an air inlet and an air outlet of the exhaust fan communicate with the bent pipe and the fluid mist separator respectively, and the vacuum hose communicates with the corresponding vacuum disc; and the fluid mist hose communicates with the connecting pipe of the second negative-pressure system.

The fluid mist separator in accordance with the present disclosure is mounted at the air outlet of the exhaust fan, which can achieve both a fluid mist separation function and a noise reduction function.

Further, two ends of the above connecting pipe respectively communicate with two sides of the corresponding vacuum disc through the vacuum hose, a top side of a middle of the connecting pipe communicates with the bent pipe, and a bottom side of the middle of the connecting pipe of the second negative-pressure system communicates with the fluid mist hose.

In accordance with the present disclosure, the top side and the bottom side of the connecting pipe communicate with the bent pipe and the fluid mist hose respectively, and the connecting positions are located horizontally, so that when the on-off valve is on, negative pressure flows from the fluid mist hose more easily.

Further, an outer side of the housing is vertically provided with rectangular steel corresponding to the first screen mesh set and the second screen mesh set, the rectangular steel and the housing form a gas channel, a bottom end of the gas channel communicates with the corresponding vacuum disc, and a top end of the gas channel communicates with the corresponding negative-pressure system through an air exhaust joint.

Further, the first screen mesh set and the second screen mesh set described above each include at least one screen mesh assembly, the bottom of the first vacuum disc and the bottom of the second vacuum disc each communicate with the fluid discharge device through a fluid discharge joint and a fluid discharge hose, and the number of the fluid discharge joint on each vacuum disc is consistent with that of the corresponding screen mesh assembly.

The disclosure divides the first screen mesh set and the second screen mesh set according to the amount of drilling fluid in the screen meshes, and can perform drying and increase treatment capacity according to actual conditions. For example, the first screen mesh set is provided with only one screen mesh, and the second screen mesh set is provided with two screen meshes.

Further, the above fluid discharge device includes a case; the case is at one side thereof provided with a fluid inlet communicating with the fluid discharge hose, and at the opposite side thereof is provided with a rectangular fluid outlet; a limiting part is arranged on an outer side of the fluid outlet, a wedge-shaped space is formed between the limiting part and the case, a wedge-shaped part is fitted within the wedge-shaped space, a fluid discharge slot is formed between a bottom of the wedge-shaped part and a bottom of the fluid outlet, the fluid discharge slot is lower than a bottom of the fluid inlet in height, and a top of the wedge-shaped part is lower than a top of the fluid outlet and higher than a top of the fluid inlet.

According to the disclosure, the fluid discharge device can achieve automatic fluid discharge without extra operation, avoid the operation that residual drilling fluid in the fluid discharge device needs to be drained every shutdown, and simplify the operational procedures of the shaker. After the drilling fluid enters the case from the fluid discharge hose, a small part of fluid flows out from the fluid discharge slot, and most of fluid is collected in the case. The fluid level in the case gradually rises until the fluid flows out from the top of the wedge-shaped part, and yet the top of the wedge-shaped part is higher than the top of the fluid inlet, so as to prevent air from being sucked into each vacuum disc from the fluid discharge hose, and to avoid affecting negative pressure acting on each screen mesh. During shutdown, residual drilling fluid in the case automatically flows out directly through the fluid discharge slot. Therefore, during shutdown, the drilling fluid can be emptied without actively opening the wedge-shaped part, so that blockage caused by solid-phase sedimentation of the residual drilling fluid in the case is avoided.

Further, a sectional area of the fluid discharge slot described above is smaller than that of the fluid inlet.

Further, the fluid discharge device further includes a mounting frame connected with the case, the mounting frame is located on a side of the case provided with the fluid outlet, a screw is spirally and vertically arranged on the mounting frame, a bottom end of the screw is rotatably fitted with the wedge-shaped part, and a hand wheel is arranged at a top end of the screw.

According to the disclosure, the wedge-shaped part is connected with the screw and the hand wheel, the wedge-shaped part can be moved in place through the hand wheel, the moving operation is convenient, and the sealing state between the wedge-shaped part and the limiting part can be ensured.

Further, the above mounting frame is a part of the base, and meanwhile, the mounting frame forms the side of the case provided with the fluid outlet.

The mounting frame according to the disclosure is used as a part of the base, so that the fluid discharge device can be simplified, and the integration degree of the whole shaker is improved.

Further, a protective cover supporting frame is arranged on the inclination angle adjustment mechanism described above, and an inlet protective cover, a middle protective cover and an outlet protective cover are arranged on the protective cover supporting frame.

The inlet protective cover, the outlet protective cover and the middle protective cover according to the disclosure are used for protecting the material inlet, the material outlet and possible contact positions of the drilling fluid with the external space, so that the drilling fluid is prevented from splashing. Meanwhile, the protective cover supporting frame is mounted on the inclination angle adjustment mechanism, and all the protective covers can be synchronously adjusted along with the inclination angle adjustment mechanism, so that a stable spacing is kept between each protective cover and the screening device, and an anti-splashing effect of the drilling fluid can be ensured.

The present disclosure has the following beneficial effects.

Firstly, there is less drilling fluid in the first screen mesh set close to the material outlet. The drying capacity of drilling cuttings can be fully exerted through the first negative-pressure system, so that the drying effect is good, and the recovery efficiency of drilling fluid is high. Moreover, continuous and uniform drying of drilling cuttings can be realized.

Secondly, there is more drilling fluid in the second screen mesh set adjacent to the first screen mesh set. Higher negative pressure is formed in the second screen mesh set through the second negative-pressure system, so that the screening capacity of the drilling fluid is improved, and the treatment capacity of the screen is effectively increased.

Thirdly, in the deep well section, the required treatment capacity of drilling fluid is smaller, but the temperature of the drilling fluid is high, and the fluid mist on the screen surface is increased. The second negative-pressure system can be switched to a fluid mist suction state by switching on the cut-off valve, the fluid mist on the screen surface is reduced, the safety is improved, and the pollution of fluid mist is reduced.

Fourthly, according to the disclosure, the fluid discharge device can achieve automatic fluid discharge without extra operation, avoid the operation that residual drilling fluid in the fluid discharge device needs to be drained every shutdown, and simplify the operational process of the shaker.

Fifthly, the fluid mist separator according to the disclosure is mounted at the air outlet of the exhaust fan, and can obtain both a fluid mist separation function and a noise reduction function.

In the drawings: 10, base; 20, fluid discharge device; 21, case; 22, mounting frame; 30, inclination angle adjustment mechanism; 31, protective cover supporting frame; 32, inlet protective cover; 33, middle protective cover; 34, outlet protective cover; 40, screening device; 41, housing; 42, first vacuum disc; 43, second vacuum disc; 44, fluid discharge joint; 45, fluid discharge hose; 50, exciting motor; 60, double-negative-pressure system; 61, support; 62, fluid mist separator; 63, fluid mist hose; 64, on-off valve; 65, exhaust fan; 66, bent pipe; 67, connecting pipe; 68, vacuum hose; 211, fluid inlet; 212, fluid outlet; 213, limiting part; 214, wedge-shaped part; 215, fluid discharge slot; 221, screw; 222, hand wheel; 411, rectangular steel; 412, air exhaust joint; 601, first negative-pressure system; 602, second negative-pressure system.

DETAILED DESCRIPTION OF THE EMBODIMENTS

The principles and features of the present disclosure are described in combination with the following accompanying drawings, the given examples are only intended to illustrate the present disclosure, but not intended to limit the scope of the present disclosure.

Figure 1:
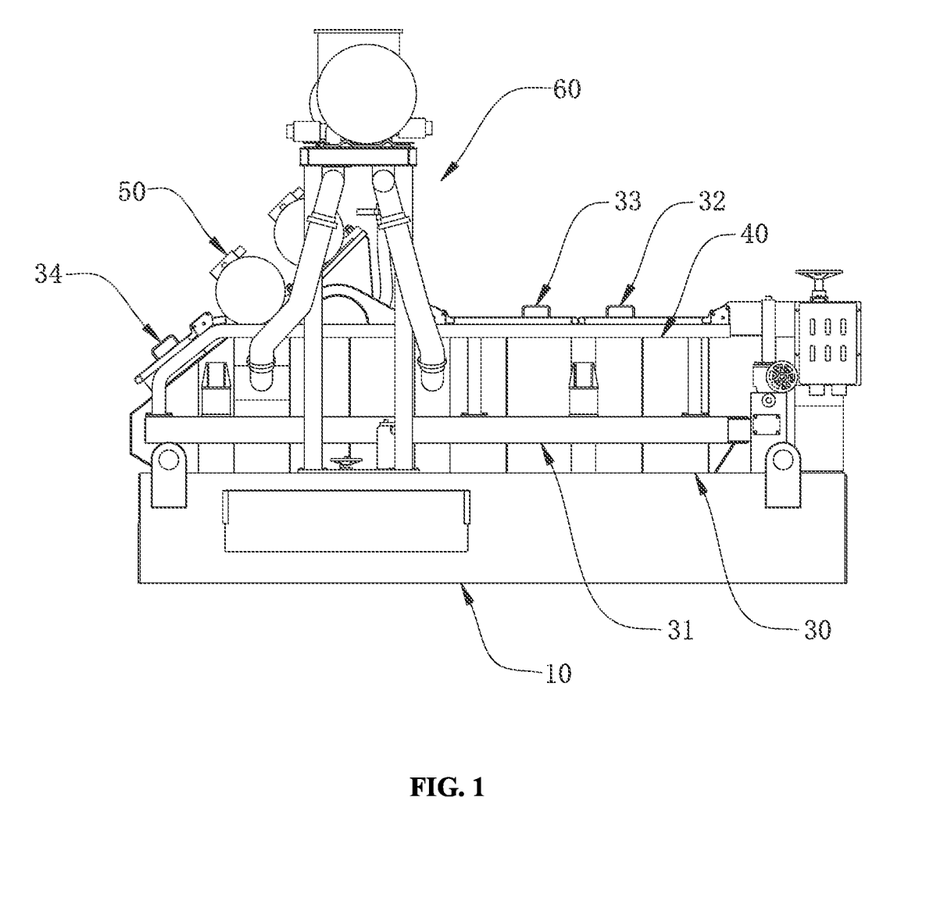
FIG. 1 is a schematic structural diagram of an independent double-negative-pressure shale shaker in accordance with the present disclosure.
Figure 2:
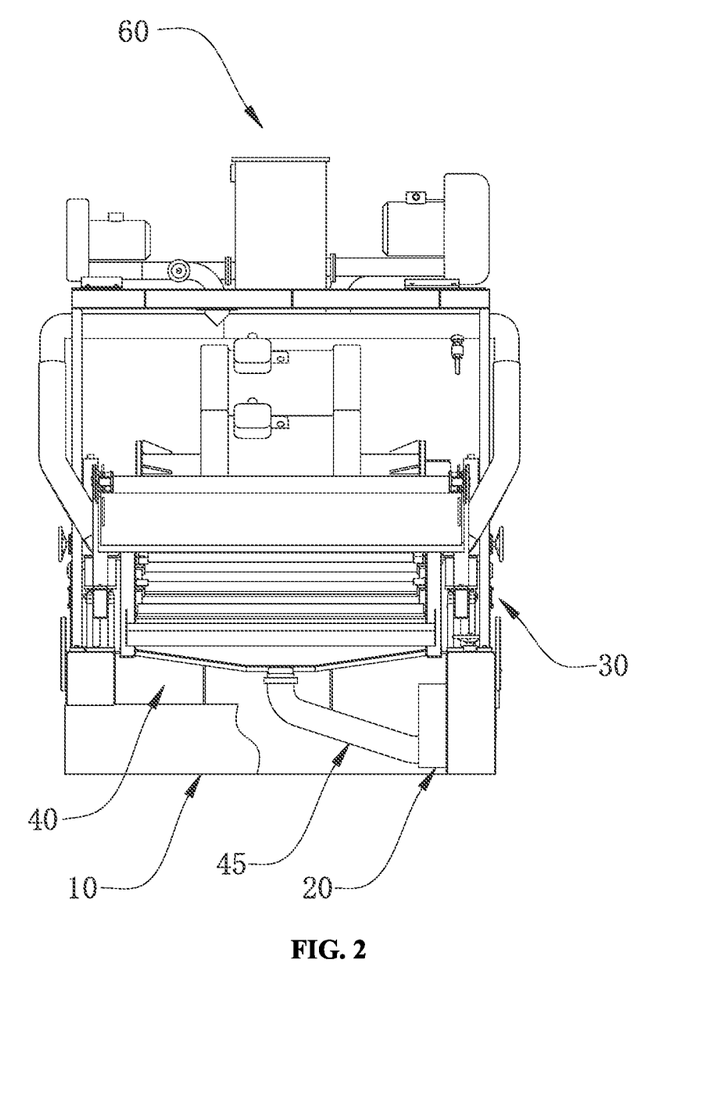
FIG. 2 is a schematic internal structural diagram of an independent double-negative-pressure shale shaker in accordance with the present disclosure.

Referring to FIG. 1 and FIG. 2, an independent double-negative-pressure shale shaker includes a base 10, a fluid discharge device 20, an inclination angle adjustment mechanism 30, a screening device 40, an exciting motor 50 and a double-negative-pressure system 60, wherein the fluid discharge device 20 is arranged inside the base 10, the inclination angle adjustment mechanism 30 is arranged on the top of the base 10, the screening device 40 is arranged on the top of the inclination angle adjustment mechanism 30 through a spring, the exciting motor 50 is arranged on the screening device 40, and the double-negative-pressure system 60 is arranged on the base 10. The double-negative-pressure system 60 generates negative pressure on the two sides of the screen mesh in the screening device 40, so that drilling fluid on the screen is subjected to negative-pressure adsorption, and finally the drilling fluid enters the fluid discharge device 20.

Figure 3:
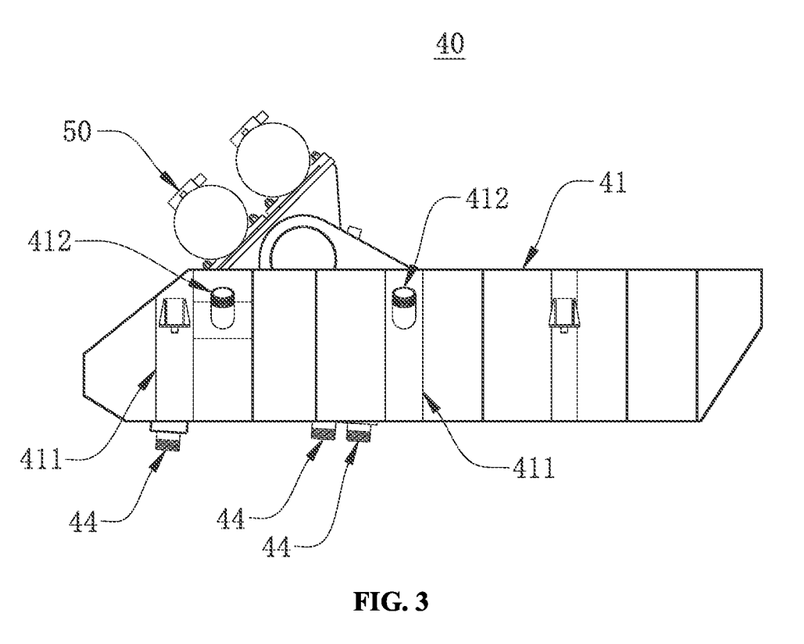
FIG. 3 is a schematic external structural diagram of a screening device in accordance with the present disclosure.
Figure 4:
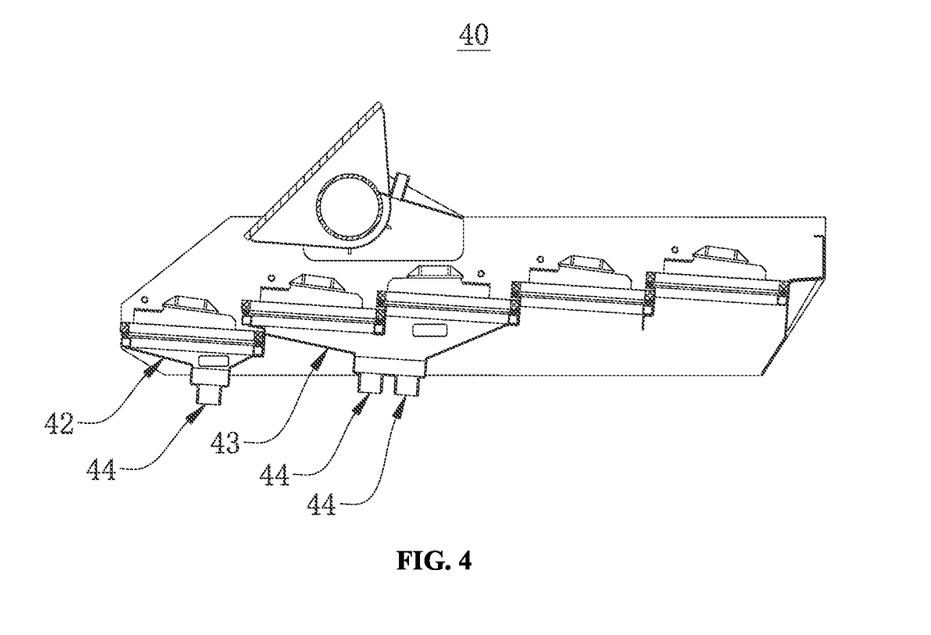
FIG. 4 is a schematic internal structural diagram of a screening device in accordance with the present disclosure.

Referring to FIG. 3 and FIG. 4, the screening device 40 comprises a housing 41 arranged on the base 10, and a first screen mesh set and a second screen mesh set which are arranged inside the housing 41 and are sequentially disposed in a direction from a material outlet to a material inlet. The first screen mesh set and the second screen mesh set are arranged adjacent to each other, and are composed of at least one screen mesh assembly, respectively. A first vacuum disc 42 and a second vacuum disc 43 are respectively arranged at the bottom of the first screen mesh set and the bottom of the second screen mesh set. In the embodiment, the first screen mesh set includes one screen mesh assembly, namely it is the screen mesh assembly closest to the material outlet. The second screen mesh set includes two screen mesh assemblies. The three screen assemblies are sequentially arranged in the direction from the material outlet to the material inlet. Other structures and connecting modes of the components of the screening device 40, such as the mounting mode of the screen mesh assembly, a screen mesh tensioning mechanism mounted on the screen mesh assembly, the mounting mode of the vacuum disc, the mounting mode of the exciting motor 50, the arrangement mode of the material inlet and the material outlet, and the like, belong to the prior art, and are not repeated here.

The respective places on two outer sides of the housing 41 corresponding to the first vacuum disc 42 and the second vacuum disc 43 are vertically provided with rectangular steels 411, respectively. A gas channel (the rectangular steel 411 is sealed) is formed between each rectangular steel 411 and the housing 41. The gas channel communicates at one end with an air exhaust joint 412 arranged on each rectangular steel 411, and communicates at the other end with a side wall of the corresponding vacuum disc. The bottom of the first vacuum disc 42 and the bottom of the second vacuum disc 43 communicate with the fluid discharge device 20 through fluid discharge joints 44 and fluid discharge hoses 45. In order to ensure the flux of flow of the drilling fluid, the number of the fluid discharge joint 44 on each vacuum disc is consistent with that of the corresponding screen mesh assembly. In order to avoid interference of other components of the housing 41, the vertical rectangular steel 411 can also be connected with transverse rectangular steel, so that the interference position is bypassed.

Referring to FIG. 1, the specific structure and mounting mode of the inclination angle adjustment mechanism 30 belong to the prior art, and are not repeated here. A protective cover supporting frame 31 is mounted on the inclination angle adjustment mechanism 30. The protective cover supporting frame 31 are provided with an inlet protective cover 32 close to the material inlet and an outlet protective cover 34 close to the material outlet. The protective cover supporting frame 31 are provided with a middle protective cover 33 near other positions where the drilling fluid is possible in contact with the external space. All the protective covers can avoid the drilling fluid from splashing. Meanwhile, the protective cover supporting frame 31 is mounted on the inclination angle adjustment mechanism 30, and all the protective covers can be synchronously adjusted along with the inclination angle adjustment mechanism 30, so that a stable spacing is kept between each protective cover and the screening device 40, and an anti-splashing effect of the drilling fluid is ensured.

Figure 5:
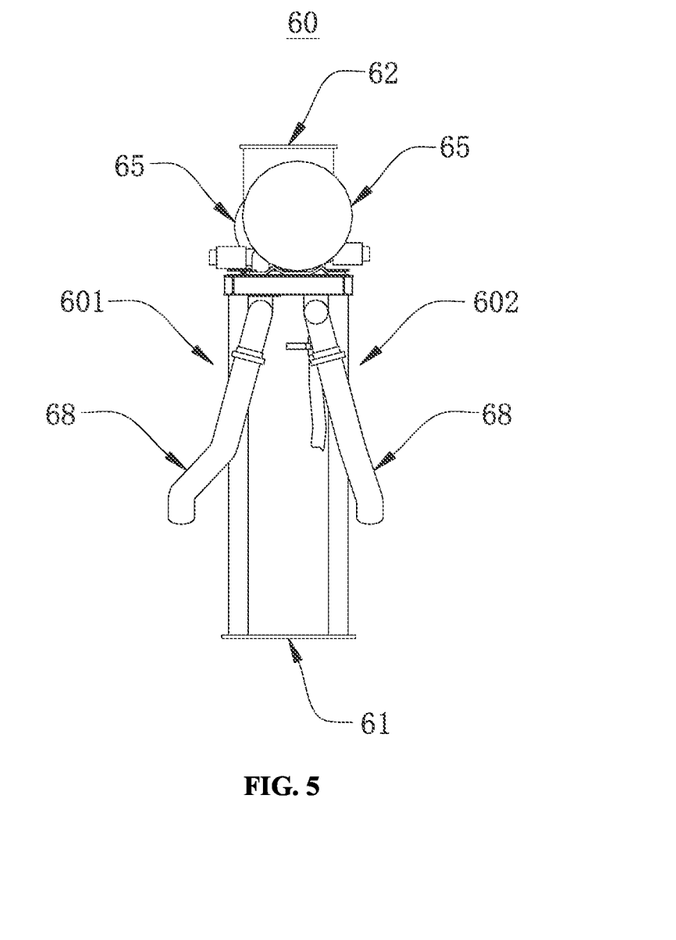
FIG. 5 is a schematic side view structural diagram of a double-negative-pressure system in accordance with the present disclosure.
Figure 6:
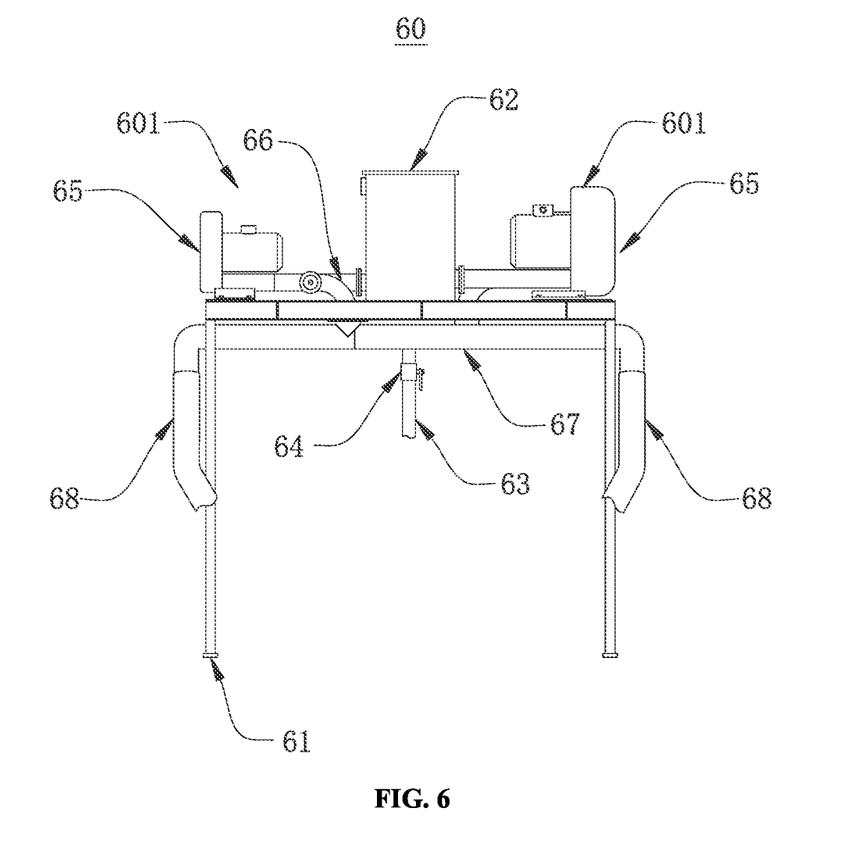
FIG. 6 is a schematic front view structural diagram of a double-negative-pressure system in accordance with the present disclosure.

Referring to FIG. 5 and FIG. 6, the double-negative-pressure system 60 includes a support 61, a first negative-pressure system 601, a second negative-pressure system 602 and a fluid mist separator 62. The support 61 is mounted on the top of the base 10. The first negative-pressure system 601, the second negative-pressure system 602 and the fluid mist separator 62 are all arranged on the support 61. Moreover, the first negative-pressure system 601 and the second negative-pressure system 602 are symmetrically arranged on the two sides of the fluid mist separator 62. The first negative-pressure system 601 and the second negative-pressure system 602 are structurally consistent and respectively communicate with the first vacuum disc 42 and the second vacuum disc 43. The first negative-pressure system 601 and the second negative-pressure system 602 are independent from each other, and form negative pressure on the first vacuum disc 42 and the second vacuum disc 43 respectively.

The first negative-pressure system 601 and the second negative-pressure system 602 each include an exhaust fan 65, a bent pipe 66, a connecting pipe 67 and a vacuum hose 68. An air outlet of the exhaust fan 65 communicates with the fluid mist separator 62, and an air inlet of the exhaust fan 65 communicates with the bent pipe 66. The connecting pipe 67 is horizontally arranged on the support 61. The two ends of the connecting pipe 67 communicate with two sides of the bottom of the corresponding vacuum disc through the vacuum hoses 68 respectively (namely communicating with the corresponding exhaust joint 412), and the gas smoothness can be increased through the two vacuum hoses 68. Optionally, in other embodiments of the present disclosure, one end of the connecting pipe 67 is blocked, and only the other end of the connecting pipe 67 is connected with the vacuum hose 68. A top side of a middle of the connecting pipe 67 communicates with the bent pipe 66.

A bottom side of the middle of the connecting pipe 67 of the second negative-pressure system 602 is connected with a fluid mist hose 63, and the fluid mist hose 63 communicates with a position of a top of the housing 41 corresponding to the second screen mesh set.

Figure 7:
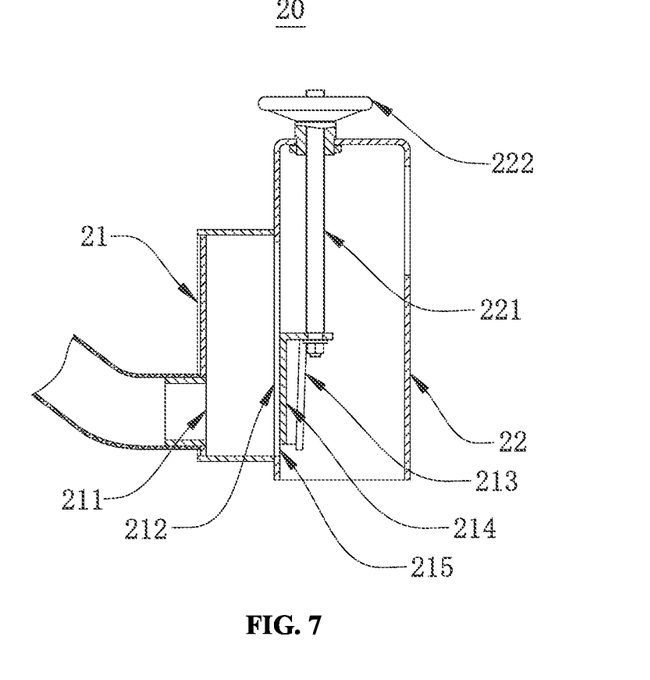
FIG. 7 is a schematic structural diagram of a fluid discharge device in accordance with the present disclosure.
Figure 8:
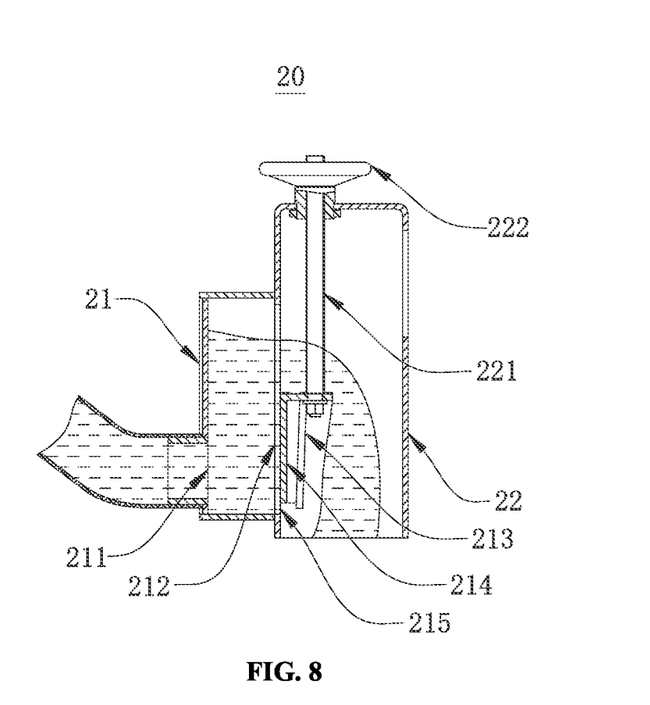
FIG. 8 is a fluid discharging schematic diagram of a fluid discharge device in accordance with the present disclosure.

Referring to FIG. 7 and FIG. 8, the fluid discharge device 20 includes a case 21 and a mounting frame 22. The case is at one side provided with a fluid inlet 211 communicating with the fluid discharge hose 45, and at the opposite side is provided with a rectangular fluid outlet 212 and the mounting frame 22. A limiting part 213 is arranged on an outer side of the fluid outlet 212. The limiting part 213 is connected with the case 21, and a wedge-shaped space is formed between the limiting part 213 and the case 21. A wedge-shaped part 214 is fitted within the wedge-shaped space. When the wedge-shaped part 214 is completely matched with the wedge-shaped space, the two sides of the wedge-shaped part 214 are sealingly matched with the case 21, and a fluid discharge slot 215 is formed between a bottom of the wedge-shaped part 214 and a bottom of the fluid outlet 212, the fluid discharge slot 215 is lower than a bottom of the fluid inlet 211 in height, and a top of the wedge-shaped part 214 is lower than a top of the fluid outlet 212 and higher than a top of the fluid inlet 211.

After the drilling fluid enters the case 21 from the fluid discharge hose 45, a small part of fluid flows out from the fluid discharge slot 215, and most of fluid is collected in the case 21. The fluid level in the case 21 gradually rises until the fluid flows out from the top of the wedge-shaped part 214, and yet the top of the wedge-shaped part 214 is higher than the top of the fluid inlet 211, so as to prevent air from being sucked into each vacuum disc from the fluid discharge hose 45, and to avoid affecting negative pressure acting on each screen mesh. During shutdown, residual drilling fluid in the case 21 automatically flows out directly through the fluid discharge slot 215. Therefore, during shutdown, the drilling fluid can be emptied without actively opening the wedge-shaped part 214, so that blockage caused by solid-phase sedimentation of the residual drilling fluid in the case 21 is avoided.

The fluid level in the case 21 needs to be increased, so that a sectional area of the fluid discharge slot 215 is smaller than that of the fluid inlet 211.

In order to facilitate movement of the wedge-shaped part 214, a screw 221 is vertically arranged on the mounting frame 22. The screw 221 is spirally fitted with the mounting frame 22. A hand wheel 222 is arranged at a top end of the screw 221. A bottom end of the screw 221 is rotatably fitted with the wedge-shaped part 214. When the hand wheel 222 is rotated, the screw 221 drives the wedge-shaped part 214 to move in the vertical direction. The sealing state between the wedge-shaped part 214 and the limiting part 213 and between the wedge-shaped part 214 and the case 21 is ensured through extrusion force between threads.

In other embodiments of the present disclosure, the mounting frame 22 is a part of the base 10, but also a part of the case 21. The fluid outlet 212 is directly opened on the mounting frame 22, namely the case 21 is directly welded on the mounting frame 22, so that the fluid discharge device 20 is simplified, thereby improving the integration degree of the whole shaker. At the moment, the mounting frame 22 can be a rectangular steel pipe in the existing base 10. In order to facilitate the installation of the hand wheel 222, a hand hole is further formed in the rectangular steel pipe.

The first negative-pressure system 601 and the second negative-pressure system 602 are two independent negative-pressure systems. The first negative-pressure system 601 communicates with the first vacuum disc 42 close to the material outlet. The second negative-pressure system 602 communicates with the adjacent second vacuum disc 43. There is less drilling fluid in the first screen mesh set close to the material outlet. The drying capacity of drilling cuttings can be fully exerted through the first negative-pressure system 601, so that the drying effect is good, and the recovery efficiency of drilling fluid is high. There is more drilling fluid in the second screen mesh set adjacent to the first screen mesh set. Higher negative pressure is formed in the second screen mesh set through the second negative-pressure system 602, so that the screening capacity of the drilling fluid is improved, and the treatment capacity of the negative-pressure shaker is effectively increased. Meanwhile, because the second negative-pressure system 602 further communicates with the top of the housing 41 through the fluid mist hose 63, in the deep well section, the required treatment capacity of drilling fluid is smaller, but the temperature of the drilling fluid is high, and the fluid mist on the screen surface is increased, the second negative-pressure system 602 can be switched to a fluid mist suction state by switching on a cut-off valve 64, thereby reducing the fluid mist on the screen surface, improving the safety, and decreasing the pollution of fluid mist.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An independent double-negative-pressure shale shaker, comprising a base (10), a fluid discharge device (20), an inclination angle adjustment mechanism (30), a screening device (40), an exciting motor (50) and a double-negative-pressure system (60), wherein the fluid discharge device (20) and the inclination angle adjustment mechanism (30) are arranged on the base (10), the screening device (40) is arranged on the inclination angle adjustment mechanism (30), the exciting motor (50) is arranged on the screening device (40), and the double-negative-pressure system (60) is arranged on the base (10);

the screening device (40) comprises a housing (41), and a first screen mesh set and a second screen mesh set which are arranged in the housing (41) and are sequentially arranged in a direction from a material outlet to a material inlet; a first vacuum disc (42) and a second vacuum disc (43) are respectively arranged at a bottom of the first screen mesh set and a bottom of the second screen mesh set, and bottom of the first vacuum disc (42) and a bottom of the second vacuum disc (43) communicate with the fluid discharge device (20);

the double-negative-pressure system (60) comprises a support (61) arranged on the base (10), and a first negative-pressure system (601), a second negative-pressure system (602) and a fluid mist separator (62) which are arranged on the support (61); the first negative-pressure system (601) communicates with the fluid mist separator (62) and the first vacuum disc (42); the second negative-pressure system (602) communicates with the fluid mist separator (62) and the second vacuum disc (43); and the second negative-pressure system (602) further communicates with a position of a top of the housing (41) corresponding to the second screen mesh set through a fluid mist hose (63), and an on-off valve (64) is arranged on the fluid mist hose (63).

2. The independent double-negative-pressure shale shaker according to claim 1, wherein the first negative-pressure system (601) and the second negative-pressure system (602) are structurally consistent, and each comprise an exhaust fan (65), a bent pipe (66), a connecting pipe (67) and a vacuum hose (68) which are sequentially connected; an air inlet and an air outlet of the exhaust fan (65) communicate with the bent pipe (66) and the fluid mist separator (62) respectively, and the vacuum hose (68) communicates with the corresponding vacuum disc; and the fluid mist hose (63) communicates with the connecting pipe (67) of the second negative-pressure system (602).

3. The independent double-negative-pressure shale shaker according to claim 2, wherein two ends of the connecting pipe (67) respectively communicate with two sides of the corresponding vacuum disc through the vacuum hose (68), a top side of a middle of the connecting pipe (67) communicates with the bent pipe (66), and a bottom side of the middle of the connecting pipe (67) of the second negative-pressure system (602) communicates with the fluid mist hose (63).

4. The independent double-negative-pressure shale shaker according to claim 1, wherein an outer side of the housing (41) is vertically provided with rectangular steel (411) corresponding to the first screen mesh set and the second screen mesh set, the rectangular steel (411) and the housing (41) form a gas channel, a bottom end of the gas channel communicates with the corresponding vacuum disc, and a top end of the gas channel communicates with the corresponding negative-pressure system through an air exhaust joint (412).

5. The independent double-negative-pressure shale shaker according to claim 1, wherein the first screen mesh set and the second screen mesh set each comprise at least one screen mesh assembly, the bottom of the first vacuum disc (42) and the bottom of the second vacuum disc (43) each communicate with the fluid discharge device (20) through a fluid discharge joint (44) and a fluid discharge hose (45), and the number of the fluid discharge joint (44) on each vacuum disc is consistent with that of the corresponding screen mesh assembly.

6. The independent double-negative-pressure shale shaker according to claim 5, wherein the fluid discharge device (20) comprises a case (21); the case (21) is at one side thereof provided with a fluid inlet (211) communicating with the fluid discharge hose (45), and at the opposite side thereof is provided with a rectangular fluid outlet (212); a limiting part (213) is arranged on an outer side of the fluid outlet (212), a wedge-shaped space is formed between the limiting part (213) and the case (21), a wedge-shaped part (214) is fitted within the wedge-shaped space, a fluid discharge slot (215) is formed between a bottom of the wedge-shaped part (214) and a bottom of the fluid outlet (212), the fluid discharge slot (215) is lower than a bottom of the fluid inlet (211) in height, and a top of the wedge-shaped part (214) is lower than a top of the fluid outlet (212) and higher than a top of the fluid inlet (211).

7. The independent double-negative-pressure shale shaker according to claim 6, wherein a sectional area of the fluid discharge slot (215) is smaller than that of the fluid inlet (211).

8. The independent double-negative-pressure shale shaker according to claim 6, wherein the fluid discharge device (20) further comprises a mounting frame (22) connected with the case (21), the mounting frame (22) is located on a side of the case (21) provided with the fluid outlet (212), a screw (221) is spirally and vertically arranged on the mounting frame (22), a bottom end of the screw (221) is rotatably fitted with the wedge-shaped part (214), and a hand wheel (222) is arranged at a top end of the screw (221).

9. The independent double-negative-pressure shale shaker according to claim 8, wherein the mounting frame (22) is a part of the base (10), and meanwhile, the mounting frame (22) forms the side of the case (21) provided with the fluid outlet (212).

10. The independent double-negative-pressure shale shaker according to claim 1, wherein a protective cover supporting frame (31) is arranged on the inclination angle adjustment mechanism (30), and an inlet protective cover (32), a middle protective cover (33) and an outlet protective cover (34) are arranged on the protective cover supporting frame (31).

11. The independent double-negative-pressure shale shaker according to claim 2, wherein a protective cover supporting frame (31) is arranged on the inclination angle adjustment mechanism (30), and an inlet protective cover (32), a middle protective cover (33) and an outlet protective cover (34) are arranged on the protective cover supporting frame (31).

12. The independent double-negative-pressure shale shaker according to claim 3, wherein a protective cover supporting frame (31) is arranged on the inclination angle adjustment mechanism (30), and an inlet protective cover (32), a middle protective cover (33) and an outlet protective cover (34) are arranged on the protective cover supporting frame (31).

13. The independent double-negative-pressure shale shaker according to claim 4, wherein a protective cover supporting frame (31) is arranged on the inclination angle adjustment mechanism (30), and an inlet protective cover (32), a middle protective cover (33) and an outlet protective cover (34) are arranged on the protective cover supporting frame (31).

14. The independent double-negative-pressure shale shaker according to claim 5, wherein a protective cover supporting frame (31) is arranged on the inclination angle adjustment mechanism (30), and an inlet protective cover (32), a middle protective cover (33) and an outlet protective cover (34) are arranged on the protective cover supporting frame (31).

15. The independent double-negative-pressure shale shaker according to claim 6, wherein a protective cover supporting frame (31) is arranged on the inclination angle adjustment mechanism (30), and an inlet protective cover (32), a middle protective cover (33) and an outlet protective cover (34) are arranged on the protective cover supporting frame (31).

16. The independent double-negative-pressure shale shaker according to claim 7, wherein a protective cover supporting frame (31) is arranged on the inclination angle adjustment mechanism (30), and an inlet protective cover (32), a middle protective cover (33) and an outlet protective cover (34) are arranged on the protective cover supporting frame (31).

17. The independent double-negative-pressure shale shaker according to claim 8, wherein a protective cover supporting frame (31) is arranged on the inclination angle adjustment mechanism (30), and an inlet protective cover (32), a middle protective cover (33) and an outlet protective cover (34) are arranged on the protective cover supporting frame (31).

18. The independent double-negative-pressure shale shaker according to claim 9, wherein a protective cover supporting frame (31) is arranged on the inclination angle adjustment mechanism (30), and an inlet protective cover (32), a middle protective cover (33) and an outlet protective cover (34) are arranged on the protective cover supporting frame (31).

\* \* \* \* \*